United States Patent [19]

Palma et al.

[11] 4,295,741
[45] Oct. 20, 1981

[54] TWO-WAVELENGTH PHASE CONTROL SYSTEM

[75] Inventors: Gary E. Palma, Rocky Hill; Francois M. Mottier, South Windsor, both of Conn.

[73] Assignee: United Technologies Corporation, Hartford, Conn.

[21] Appl. No.: 71,509

[22] Filed: Aug. 30, 1979

[51] Int. Cl.³ ............................................. G01B 9/02
[52] U.S. Cl. .................................... 356/349; 250/201
[58] Field of Search ........................ 356/349; 250/201

[56] References Cited

U.S. PATENT DOCUMENTS 3,825,845 7/1974 Angelbeck .......................... 330/4.3

Primary Examiner—Conrad J. Clark
Attorney, Agent, or Firm—Lawrence A. Cavanaugh

[57] ABSTRACT

In accordance with the present invention, output beams from a plurality of optical amplifiers in an oscillator-amplifier optical configuration are phase matched utilizing a feedback system employing phase error signals generated by optically heterodyning a frequency shifted, two-wavelength reference beam, with a portion of the output from each of the plurality of amplifiers. Electrical signals from detectors responsive to the optical heterodyned signals are processed in control circuits to provide coarse and fine phase error signals to control elements for controlling the optical path difference of the beams of radiation passing through each of the amplifiers for phase matching the beams. Coarse error signals having a synthetic wavelength with an extended phase range of many wavelengths are generated by dividing the electrical signal from the detectors, homodyning the divided signals from each detector to provide a beat signal, passing the beat signal through a low-pass band filter centered at the frequency difference of the frequency shifted reference beams and heterodyning the filtered beat signals from two detectors. Fine error signals are generated by passing the divided electrical signal from each detector through a band-pass filter centered at the frequency of one of the frequency shifted reference beams and heterodyning the filtered signal from each detector with the filtered signal from a standard detector. The synthetic wavelength of the coarse error signal enables the control system to drive the optical path difference of the output beams toward zero with minimal $2\pi N$ phase ambiguity.

12 Claims, 4 Drawing Figures

TWO-WAVELENGTH PHASE CONTROL SYSTEM

BACKGROUND OF THE INVENTION

This invention relates to adaptive optics control systems for use with high power lasers and more particularly to a two-wavelength control system capable of generating synthetic long wavelength error signals for minimizing $2\pi N$ ambiguity.

Lasers having a chemical gain medium such as hydrogen fluoride or deuterium fluoride are attractive for many potential high power applications because of their short wavelength and high power capabilities. However, the gain medium of the chemical laser inherently has a low density and thus requires a large volume and it operates efficiently only on many simultaneous transitions which are chemically related but optically independent. Large scale annular resonators suitable for use with chemical lasers and capable of extracting good quality beams at high efficiency are difficult to fabricate. The utilization of a master oscillator with a plurality of amplifiers driven in parallel with the oscillator is one method of obtaining high power output. However, the efficient utilization of the output beam from such an oscillator-amplifier configuration requires that the phase distribution of the output of each amplifier be matched. Additionally, potential problems are encountered because of multi-line operation in which lasing can switch, at high frequency, between different optical transitions in the gain profile the resulting phase fluctuations and distortions of the multiple output beams are difficult to compensate for. Additionally, anomalous dispersion causes the local index of refraction within each of the optical amplifiers to vary away from the line center across the gain profile. Thus, differential beam steering occurs between the different frequency beams passing through the optical amplifiers resulting in a reduction in the optical quality of the output beam. These degradation effects can produce significant reduction in the far field beam intensity if the gain profiles are dominated by inhomogeneously broadened gain profiles.

Remote control of optical path length within an amplifier-oscillator configuration or within an oscillator configuration forms the basis of a field of adaptive optics which includes the control of deformable mirrors, the alignment and phasing of multi-mirror systems, and the control of laser phase arrays. An acquisition problem common to all of these adaptive optics systems is the $2\pi N$ ambiguity or equalization of path length. In either case, the acquisition problem results from an initial optical path difference across the system aperture which is appreciably greater than the optical wavelength of the laser radiation. A single wavelength adaptive controller, as is known in the prior art, will match path lengths to within an integral number of wavelengths resulting in $2\pi N$ ambiguity. This results in an optical system that converges to a state of non-zero optical path difference producing a degradation of the system performance in most cases of interest. To assure that the phase of each laser transition is matched from all amplifiers in the far field, it is necessary to equalize the optical path length from the oscillator exit through the amplifiers to a transmitter to within a small fraction of a wavelength. This would be extremely difficult to accomplish with a non-adaptive mirror system. However, in an adaptive system utilizing a system of independently controlled mirrors, optical path equalization is possible.

Warren in a Contract Report, SAMSO-TR-78-50, dated Feb. 16, 1978, discloses an adaptive optics system in which two lasing lines of a multi-line oscillator are sensed using a dispersive element to separate two lasing frequencies from the output of the oscillator. The beams having the two different frequencies are given different modulation frequencies and are incident onto a beat frequency detector. The use of different frequency modulation of different laser lines allows the comparison of the phase of one line passing through one amplifier with the phase of the same line from a second amplifier and the adjustment of a control mirror to bring the beams into phase. Additionally, the phase difference between the output from two amplifiers on a second line can be compared and the control mirror adjusted to bring the beams on the second laser line into phase. These steps are repeated for the radiation passing through all of the amplifiers within an optical system to obtain a combined output beam having all components in phase. Preferably the radiation passing through one amplifier is utilized as a standard for the comparison of all other radiation for phase matching the wavefront distribution emanating therefrom. As suggested by Warren, the important criteria is to make the optical path lengths through the amplifiers the same, and only two lines need to be sensed for phase matching. Once the equal length criteria is established, any line hopping in the oscillator will not destroy the phase-matched property of each line passing through the optical amplifiers. However the acquisition and control of the information to minimize or eliminate the optical path difference between the radiation passing out of each optical amplifier is difficult because of the $2\pi N$ ambiguity problem.

SUMMARY OF THE INVENTION

A primary object of the present invention is the elimination of $2\pi N$ ambiguity in error signals for the control of the phase distribution of an output beam from a multi-line laser having high power.

In accordance with the present invention, a two-wavelength phase control system for use with a multi-line laser to generate unambiguous feedback error signals for an adaptive optics control system is disclosed. The two-wavelength phase control system comprises an optical oscillator for providing an input beam having a multi-line spectrum; an interferometer having a reference leg, a phase leg, means for directing a first portion of the input beam to the phase leg for providing phase beams and for directing a second portion of the input beam to the reference leg for providing a reference beam and means for combining the reference beam and the phase beam for providing signal beams; means disposed within the reference leg for separating at least a first beam at a first wavelength and a second beam at a second wavelength from the second portion of the input beam and for directing said first beam to a first frequency shifter and said second beam to a second frequency shifter; a first frequency shifter disposed within the reference leg for providing a first frequency shift of the first beam; a second frequency shifter disposed within the reference leg for providing a second frequency shift of the second beam; means for combining the first beam and the second beam into a reference beam having two wavelengths and for directing the reference beam to the means for combining the reference and phase beams; means disposed within the phase leg for separating the first portion of the input beam into at least two amplifier beams and for directing said amplifier beams to at least two optical amplifiers; at least two optical amplifiers disposed within the phase leg for amplifying each of the amplifier beams to provide at least two output beams having high power; a coupler for passing a first portion of each of the output beams out of the interferometer as target beams and for directing a second portion of the output beams through the phase leg as phase beams to the means for combining the reference beam and the phase beams; at least two detectors in optical alignment with the signal beams wherein each detector is in register with the output beam of one of the optical amplifiers for providing electrical output signals; a phase control system responsive to the electrical output signals for producing fine error signals and coarse error signals; actuator means responsive to the fine and coarse error signals attached to the means for separating the first portion of the input beam into at least two amplifier beams for controlling the optical path difference between each of the amplifier beams passing through the optical amplifiers for matching the phase distribution of each of the output beams; and selector means for providing fine or coarse error signals to said actuator means.

A primary feature of the present invention is the optical heterodyning of a reference beam having a first and second shifted frequency with each of the phase beams to produce electrical output signals at the first and second shifted frequency of the reference beam. Additionally, the phase control system includes a fine mixing circuit adapted for heterodyning a portion of the electrical output signal from one of the detectors with a portion of the electrical output signal from a standard detector at the frequency of the frequency shifted first beam for providing fine error signals to the actuator means. The phase control system also includes a course mixing circuit wherein the remaining portion of the electrical output signal from the detector is divided and homodyned to provide a first beam signal; the remaining portion of the electrical output signal from the standard detector is divided and homodyned to provide a standard beat signal and the first beat signal and the standard beat signal are heterodyned at the difference frequency of the shifted frequencies of the first and second beams to provide a coarse error signal having a synthetic wavelength with an established phase range of many wavelengths. The phase control system also includes a comparator for analyzing the coarse error signals to provide a selector signal to switch means for controlling the passage of either the coarse or fine error signals to the actuator means and an integrator, sample-hold circuit for controlling the coarse and/or fine error signals for controlling the phase distribution of each of the output beams passing from the optical amplifiers. Also, in the preferred embodiment, the actuator means comprise piezoelectric transducers attached to the means for separating the first portion of the input beam into amplifier beams.

An advantage of the present invention is that the optical path difference across the aperture of an optical system can be controlled over a range of many optical wavelengths. Additionally, the system can be used to unambiguously drive each segment of an adaptive control system to a position of zero-path length difference with respect to a standard signal from one segment with an array of optical amplifiers. This condition represents a global maximum in the far field radiance of the laser system for systems employing either multi-line lasers or continuous deformable mirrors. Also, high power output with a phase-matched wavefront distribution from a multi-line, multi-amplifier laser system is possible without $2\pi N$ ambiguity in the coarse error signals. High resolution is obtainable utilizing the fine error signals. Additionally, the coarse error signals have a synthetic wavelength inversely proportional to the difference wavelength of the first and second shifted frequencies of the reference beam resulting in the elimination or minimization of $2\pi N$ ambiguity. The coarse error signal is utilized for unambiguous acquisition of the optical path difference and the fine error signal is utilized for precise control of the optical path difference to a small fraction of the optical wavelength.

The foregoing and other objects, features and advantages of the present invention will become more apparent in the light of the following detailed description of preferred embodiment thereof as discussed and illustrated in the accompanying drawing.

DESCRIPTION OF THE PREFERRED EMBODIMENT

Figure 1:
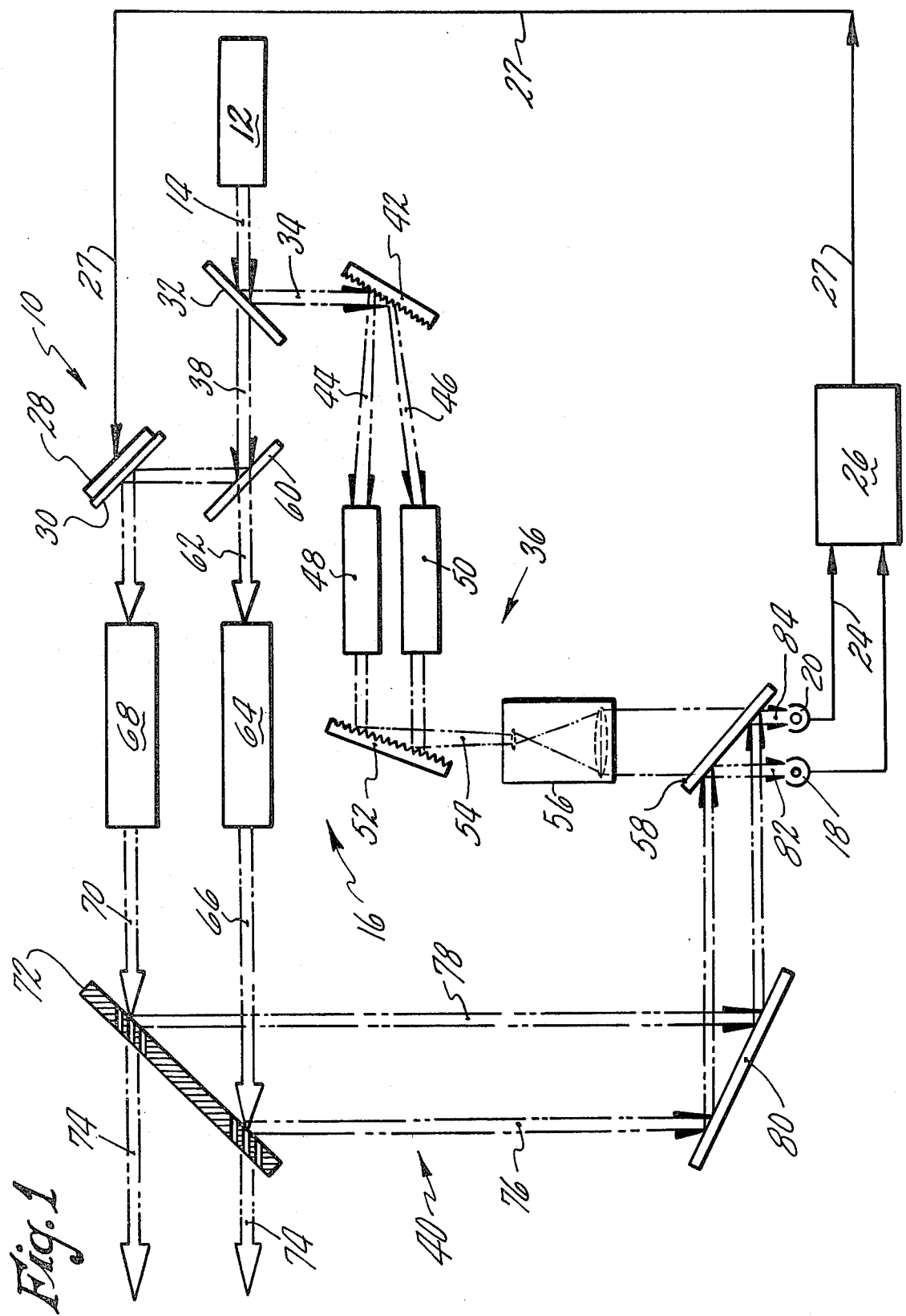
FIG. 1 is a simplified schematic of a two-wavelength phase control adaptive optic system.

Referring now to FIG. 1 wherein a simplified schematic of a two-wavelength phase control adaptive optic system 10 is shown. The system includes an oscillator 12, adapted for providing an input beam 14 having multiple lines, an interferometer 16 in alignment with the optical path of the input beam 14 and adapted for providing a two-wavelength heterodyned signal beam, a first and second detector 18, 20 respectively, for sensing the signal beam to produce a first and second electrical output signal 22, 24 respectively, a phase controller 26 having a fine and coarse control circuit as shown in more detail in FIG. 2, responsive to the electrical output signals for providing error signals 27 to an actuator 28 such as a piezoelectric transducer attached to a control mirror 30 within the interferometer for adjusting the optical path difference of phase beams as hereinafter described in more detail.

The interferometer 16 includes a first beam splitter 32 disposed within the optical path of the input beam 14 for directing a reference portion 34 of the input beam to the reference leg 36 of the interferometer and for passing a phase portion 38 of the input beam to a phase leg 40 of the interferometer. The reference leg 36 includes a wavelength selector 42 such as a diffraction grating for separating a first beam of radiation 44 having a first wavelength $\lambda_1$ and a second beam of radiation 46 having a second wavelength $\lambda_2$ from the reference portion 34 of the input beam and for directing said first and second beams to a first and second frequency shifter 48, 50 respectively such as acousto-optic modulators. The first frequency shifter 48 is adapted for providing a first frequency shift $f_1$ of the first beam and the second frequency shifter 50 is adapted for providing a second frequency shift $f_2$ of the second beam wherein $f_1$ is not equal to $f_2$. A combiner 52 such as a diffraction grating is adapted for recombining the frequency shifted first and second beams into a single reference beam 54 having two wavelengths and for directing said reference beam through an expander 56 for expanding and collimating the reference beam, such as a lens system or the like which are well known in the art, to a second beam splitter 58.

The phase leg 40 of the interferometer includes a third beam splitter 60 adapted for passing a portion of the phase portion 38 of the input beam 14 as an amplifier beam 62 through a first optical amplifier 64 to provide a first output beam 66 and for directing the remaining portion of the phase portion of the input beam to the control mirror 30 which directs the beam through a second optical amplifier 68 to provide a second output beam 70. A coupler 72 passes a major portion of the output beams 66, 70 out of the interferometer as target beam 74 and directs the remaining portion of the output beams as first and second phase beams 76, 78 respectively to a turning mirror 80 which reflect the phase beams to the second beam splitter 58 where the first and second phase beams are heterodyned with the expanded reference beam 54 to provide first and second signal beams 82, 84 respectively to the first and second detectors 18, 20 respectively.

Figure 2:
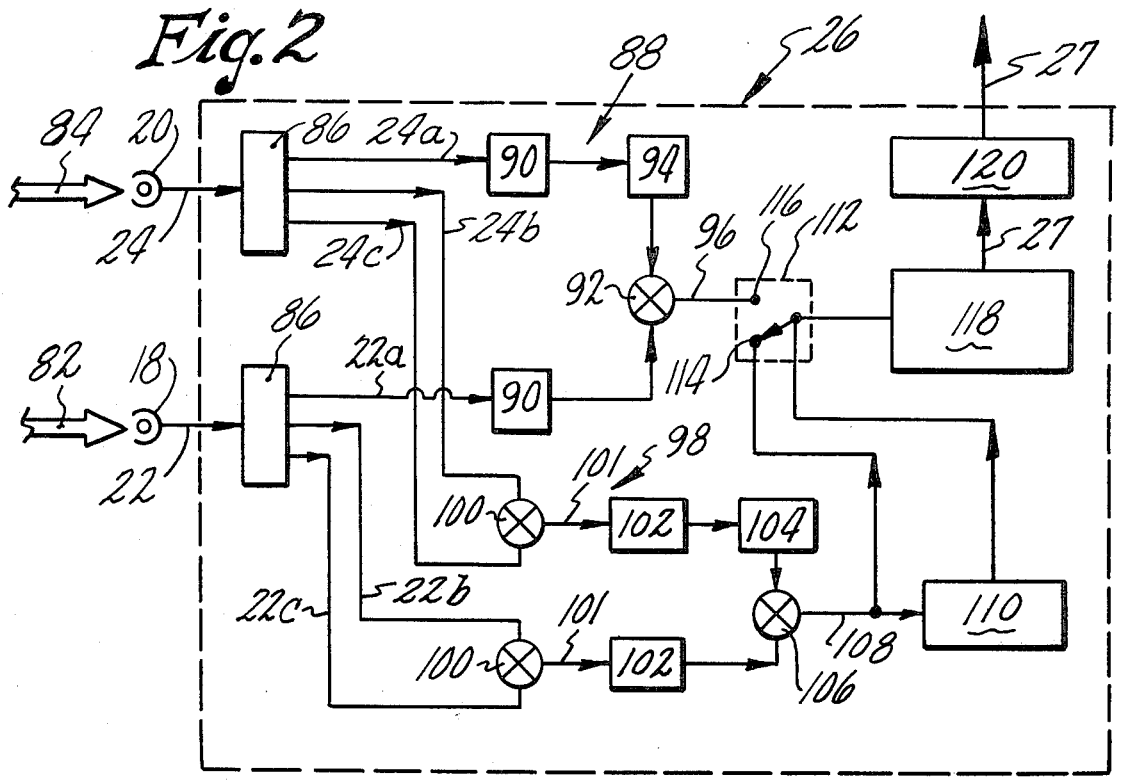
FIG. 2 is a simplified schematic of the coarse and fine phase error circuits of the phase controller shown in FIG. 1.

Referring now to FIG. 2 wherein the phase controller 26 as shown in FIG. 1 is shown in greater detail. The first electrical output signal 22 from the first detector 18 is divided into essentially three equal signals 22a, 22b and 22c by a signal divider 86 and the second electrical output signal 24 from the second detector 20 is divided into essentially three equal signals 24a, 24b and 24c by a signal divider 86. A first portion 22a of the first electrical output signal is directed to a fine error control circuit 88, where it passes through a band-pass filter 90 centered at the first shifted frequency of the reference beam to a mixer 92. A first portion 24a of the second electrical output signal is passed through a band-pass filter 90 centered at the first shifted frequency of the reference beam, phase shifted ninety degrees in shifter 94 and heterodyned with the first portion 22a of the first electrical signal in the mixer 92 to produce a fine error signal 96. The second electrical output signals 24b, 24c from the second detector are directed to a coarse control circuit 98 and homodyned in a mixer 100 producing a beat signal 101 which is passed through a second band-pass filter 102 centered at the frequency difference of the first and second shifted frequency of the reference beam, phase shifted ninety degrees by a shifter 104 and directed to a mixer 106. The electrical output signals 22b and 22c from the first detector are mixed in the mixer 100 within the coarse control circuit to provide a beat signal 101 which is passed through a second band-pass filter 102 centered at the frequency difference of the first and second frequency shifted reference beam to the mixer 106 where it is heterodyned with the beat signal from the second detector to produce a coarse error signal 108 having a synthetic wavelength with an extended phase range of many wavelengths. The coarse error signal is analyzed in a comparator 110 having a predetermined selector level for providing a signal to switch 112 for activating the switch from a first position 114 for passing the coarse error signal to a second position 116 for passing the fine error signals to an integrator, sample-hold circuit 118 as is well known in the art. The output from the integrator, sample-hold circuit is amplified by an amplifier 120 and passed as an error signal 27 to the actuator 28.

Although the apparatus as shown in FIGS. 1 and 2 and described hereinbefore includes only two optical amplifiers, two detectors, and one phase controller having a coarse error and fine error circuit, it is to be recognized that the present invention may include an array of N optical amplifiers for amplifying the output of a multi-line oscillator having M discrete spectra lines. It is to be recognized that for N optical amplifiers, N detectors will be required with $N-1$ control systems. Additionally, $N-1$ control mirrors having actuators attached thereto will be required for adjusting the optical path difference of the radiation passing through each amplifier. One optical amplifier from the array with a corresponding detector will be utilized as a standard amplifier and detector against which the phase distribution of the radiation passing through the remaining $N-1$ optical amplifiers will be phase matched. Thus, only $N-1$ phase controllers are required. It is also to be recognized that the operational characteristics of a system having N optical amplifiers and M discrete spectra lines may be adequately described in reference to two optical amplifiers, two detectors and one phase controller, wherein the process for phase matching the output of one optical amplifier with the output of a standard optical amplifier is repeated in an iterative manner for phase matching the output of the remaining optical amplifiers with the output of the standard optical amplifier.

In operation, the master oscillator 12 directs an input beam 14 having multiple lines into the interferometer 16 wherein the first beam splitter 32 directs a reference portion of the input beam through the reference leg of the interferometer where the beam is wavelength-divided into a first and second beam which are frequency shifted a first and second frequency by the acousto-optical modulators 48, 50, recombined into a single reference beam 54 having two wavelengths and expanded by the expander 56 to provide illumination of a large area on the second beam splitter 58. The phase portion 38 of the radiation passing into the phase leg of the interferometer is directed onto a third beam splitter 60 where a first portion is transmitted through the beam splitter to the first optical amplifier 64 and a second portion having an intensity substantially equal to the portion passed through the beam splitter is reflected to control mirror 30 which directs the beam to the second optical amplifier 68. The control mirror 30 has a piezoelectric transducer 28 attached to the back surface thereof adapted for receiving error signals for translating the control mirror to adjust the optical path difference between the radiation passing through the first optical amplifier and the radiation passing through the second optical amplifier to phase match the output beams 66, 70. A major portion of the output beams 66, 70 are passed through the coupler 72 as target beams 74 which are transmitted to a remote target. The remaining portion of the output beams 66, 70 are directed by the coupler through the phase leg as first and second phase beams 76, 78 and are made incident onto the second beam splitter where the first and second phase beams are heterodyned in a conventional manner with the expanded reference beam to produce the first and second signal beams 82, 84 respectively. The first and second signal beams are processed within the phase controller to unambiguously drive the control mirror 30 to a position of zero-path length difference with respect to the optical path length of the radiation passing through the first amplifier. The zero-path length difference results in a global maximum in the far field irradiance produced by the array of optical amplifiers. In a typical prior art adaptive optics system, the $2\pi N$ ambiguity in the detection of the zero-path length difference would tend to converge the error signals on a local maximum of the intensity of the target beam.

The fine error circuit 88 within the phase controller 26 produces a fine error signal $$S_f = \sin \frac{2\pi}{\lambda_1} d \qquad (1)$$

where $\lambda_1$ is the wavelength of the reference beam which has been frequency shifted by frequency $f_1$ and d is the optical path difference of the first and second output and phase beams. The coarse error circuit 98 within the phase controller 26 produces a coarse error signal $$S_c = \sin \frac{2\pi}{\lambda_{12}} d \qquad (2)$$

where $$\lambda_{12} = \frac{\lambda_1 \lambda_2}{\lambda_2 - \lambda_1} \approx \frac{\lambda_1^2}{\Delta \lambda} \qquad (3)$$

where $\lambda_2$ is the second wavelength of the reference beam which has been frequency shifted by frequency $f_2$ and $\lambda_{12}$ is a synthetic wavelength corresponding to the beat frequency $f_2-f_1$.

Figure 3:
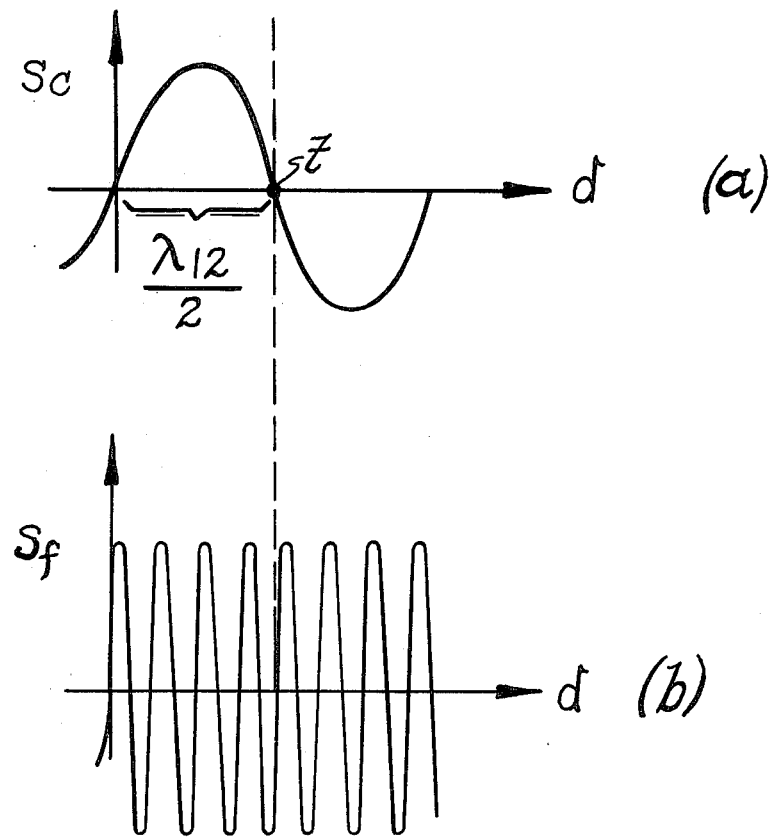
FIG. 3a is a simplified representation of the coarse error signal.
FIG. 3b is a simplified schematic of the fine error signal produced in accordance with the invention.

Referring now to FIG. 3a which shows the form of the coarse error signal as a function of optical path difference. As can be seen the coarse error signal is unambiguous over an optical path difference range of:

$$d_{max} = \pm \frac{\lambda_{12}}{2} \approx \pm \frac{\lambda_1^2}{2\Delta\lambda} \qquad (4)$$

From equation 4, it is seen that the optical path difference range $d_{max}$ can greatly exceed one wavelength. Also for a given wavelength, the range can be further extended by choosing the wavelengths of the first and second beams of the reference beam to be closely spaced. The coarse error signals $S_c$ can therefore be utilized for the unambiguous acquisition of the phase matching tracking with an initial path lengths mismatch of up to $(\lambda_1^2/2\Delta\lambda)$ waves.

Referring now to FIG. 3b wherein the fine error signal as a function of optical path difference is shown. As can be seen, the fine error signal has a $2\pi N$ ambiguity over an arbitrary optical path difference $d=\mathcal{Z}$. Thus, the coarse error signal is utilized to unambiguously acquire the tracking signal for phase matching and the fine error signal is utilized to provide fine adjustment of the control mirrors to adjust the optical path difference to a fraction of a wavelength. The techniques of processing the signals for tracking are well known in the art, and the operation of the comparator and integrator, sample-hold circuits are not detailed.

The sinusoidal form of the coarse and fine control signals are best suited to a Type I control system, that is a velocity feedback system with threshold switching between coarse and fine signals for acquisition and fine tracking of the optical path difference. Switching to the fine error signal is necessary for precise control of the optical path difference, to a small fraction of the optical wavelength. In the presence of an initial path length difference fine and coarse error signals 91, 108 respectively, will exist. A positive and a negative threshold value are set in the comparator 110 for the coarse error signal corresponding to $\pm\lambda/2$ of path length difference. When the path length difference d is larger than $\lambda/2$ in absolute magnitude, i.e. $d > |\lambda/2|$, the switch 112 is in the first position 114, and the coarse error signal 108 is processed in the integrator, sample-hold circuit and the output is amplified by amplifier 120 and applied to the actuator 28. By the principles of a Type I control loop, the motion of the actuator 28 will tend to correct for the initial path length difference of the radiation passing through the optical amplifiers causing the coarse error signal 108 to drive toward zero. When the path length difference is less than $\lambda/2$ in magnitude, i.e. $d > |\lambda/2|$, the switch 112 moves to the second position 116 and any remaining path length difference is corrected by the fine error signal 96, using the same integrator, amplifier and actuator, 118, 20 and 28 respectively.

Additionally, the coarse control loop must converge to an optical path difference of less than $\pm\lambda/4$ to guarantee smooth hand-off to the fine control loop. This limits the acquisition range of the coarse control loop for a given signal-to-noise ratio (S/N) to approximately $$d_{max} \leq \frac{\pi}{4} (S/N)^{\frac{1}{2}} \lambda_1 \qquad (5)$$

Thus, for an acquisition range of approximately one hundred waves, a (S/N) of 40 db is required for the coarse channel.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. An adaptive optics control system for mitigating $2\pi N$ ambiguity in error signals for the control of the phase distribution of an output beam from a multi-line laser comprising:

an interferometer having a reference leg, a phase leg, means for directing a first portion of an input beam having a multi-line spectrum from a laser to the phase leg for providing phase beams and for directing a second portion of the input beam to the reference leg for providing a reference beam and means for combining the reference beam and phase beams for providing signal beams;

means disposed within the reference leg for separating from the second portion of the input beam at least a first beam at a first wavelength and a second beam at a second wavelength and for directing said first beam to a first frequency shifter and said second beam to a second frequency shifter;

a first frequency shifter disposed within the reference leg for providing a first frequency shift of the first beam;

a second frequency shifter disposed within the reference leg for providing a second frequency shift of the second beam;

means for combining the first beam and the second beam into a reference beam having two frequency shifted wavelengths and for directing said reference beam to the means for combining the reference and phase beams;

means disposed within the phase leg for separating the first portion of the input beam into at least two amplifier beams and for directing said amplifier beams to at least two optical amplifiers;

at least two optical amplifiers disposed within the phase leg for amplifying each of said amplifier beams to provide at least two output beams having high power;

coupler means for passing a first portion of each of the output beams out of the interferometer as target beams and for directing a second portion of the output beams through the phase leg as phase beams to the means for combining the reference beam and the phase beams;

at least two detectors in optical alignment with the signal beams wherein each detector is in register with the output beam of one of the optical amplifiers for providing electrical output signals and wherein one detector is a standard detector;

a phase control system responsive to the electrical output signals for providing fine error signals and coarse error signals to actuator means; and actuator means responsive to the fine and coarse error signals attached to the means for directing said amplifier beams to the optical amplifiers for adjusting the optical path difference between each of the output beams for providing phase-matching of the phase distribution of each of the output beams for providing target beams having high optical quality.

2. The invention in accordance with claim 1 wherein the means for separating from the second portion of the input beam at least a first beam at a first wavelength and a second beam at a second wavelength is a diffraction grating.

3. The invention in accordance with claim 1 wherein the means for combining the first and second beam into a reference beam is a diffraction grating.

4. The invention in accordance with claim 1 wherein the phase control system comprises:
a fine mixing circuit for heterodyning a first portion of the electrical output signal from one detector with a first portion of the electrical output signal from the standard detector for providing a fine error signal to the actuator means;
a coarse mixing circuit for heterodyning a second portion of the electrical output signal from one detector with a second portion of the electrical output signal from the standard detector for providing coarse error signals having a synthetic wavelength to the actuator means; and
a comparator for providing a selector signal to switch means for controlling the passage of either the fine or coarse error signals to the actuator means.

5. The invention in accordance with claim 4 wherein the coarse mixing circuit comprises:
a first mixer for homodyning the second portion of the electrical output signal from one detector to provide a beat signal;
a second mixer for homodyning the second portion of the electrical output signal from the standard detector to provide a standard beat signal;
a band-pass filter centered at the frequency difference of the first and second shifted frequency of the reference beam;

phase shifter means for shifting the phase of the beat signal; and
means for heterodyning the beat signal and the standard beat signal to provide a coarse error signal having a synthetic wavelength with an extended phase range of many optical wavelengths.

6. The invention in accordance with claim 4 further including:
an integrator, sample-hold circuit for controlling the coarse and/or fine error signals passing to the actuator means for adjusting the optical path difference of each of the amplifier beams passing through the optical amplifiers.

7. The invention in accordance with claim 4 wherein the fine mixing circuit comprises:
a first band-pass filter centered at the first shifted frequency of the reference beam for filtering the shifted frequency from the first portion of the electrical output signal from one detector;
a second band-pass filter centered at the first shifted frequency of the reference beam for filtering the shifted frequency from the first portion of the electrical output signal from the standard detector;
a frequency shifter for shifting the electrical phase of the first portion of the electrical output signal from one detector passing through the band-pass filter; and
a mixer for heterodyning the first portion of the electrical output signal from one detector passing through the first band-pass filter with the first portion of the electrical output signal from the standard detector passing through the second band-pass filter for providing a fine error signal.

8. An adaptive optics control system for mitigating $2\pi N$ ambiguity in error signals for the control of the phase distribution of an output beam from a multi-line laser comprising:
an interferometer having a reference leg, a phase leg, means for directing a first portion of an input beam having a multi-line spectrum from a laser to the phase leg for providing phase beams and for directing a second portion of the input beam to the reference leg for providing a reference beam and means for combining the reference beam and the phase beams for providing signal beams;
a first diffraction grating disposed within the reference leg for separating, from the second portion of the input beam, at least a first beam at a first wavelength and a second beam at a second wavelength and for directing said first beam to a first frequency shifter and said second beam to a second frequency shifter;
a first frequency shifter disposed within the reference leg for providing a first frequency shift of the first beam;
a second frequency shifter disposed within the reference leg for providing a second frequency shift of the second beam;
a second diffraction grating disposed within the reference leg for combining the first beam and the second beam into a reference beam having two frequency shifted wavelengths and for directing said reference beam to the means for combining the reference beam and the phase beam;
means disposed within the phase leg for separating the first portion of the input beam into at least two amplifier beams and for directing said amplifier beams to at least two optical amplifiers;

at least two optical amplifiers disposed within the phase leg for amplifying each of said amplifier beams to provide at least two output beams having high power;

coupler means for passing a first portion of each of the output beams out of the interferometer as target beams and for directing a second portion of the output beam through the phase leg as phase beams to the means for combining the reference beam and the phase beams;

at least two detectors in optical alignment with the signal beams wherein each detector is in register with the output beam of one of the optical amplifiers for providing electrical output signals and wherein one detector is a standard detector;

a phase control system responsive to the electrical output signals for providing fine error signals and coarse error signals to actuator means including:

a fine mixing circuit for heterodyning a first portion of the electrical output signal from one detector with a first portion of the electrical output signal from the standard detector for providing a fine error signal to actuator means, a coarse mixing circuit for heternodyning a second portion of the electrical output signal from one detector with a second portion of the electrical output signal from the standard detector for providing coarse error signals having a synthetic wavelength to the actuator means;

a comparator for providing a selector signal to switch means for controlling the passage of either the fine or coarse error signals to the actuator means;

an integrator, sample-hold circuit for controlling the coarse and/or fine error signals for controlling the phase distribution of each of the output beams passing from the optical amplifiers; and actuator means responsive to the fine and coarse error signals attached to the means for directing said amplifier beams to the optical amplifiers for adjusting the optical path difference between each of the output beams for providing phase matching of the phase distribution of each of the output beams for providing target beams having high optical quality.

9. The invention in accordance with claims 1 or 8 further including an expander disposed within the reference leg of the interferometer for expanding and collimating the reference beam onto the means for combining the reference beam and the phase beams.

10. A method for mitigating $2\pi N$ ambiguity in error signals for the control of the phase distribution of an output beam for a multi-line laser comprising:

directing radiation from a multi-line laser as an input beam to an interferometer having a reference leg and a phase leg;

directing a first portion of the input beam to the phase leg for providing phase beams;

directing a second portion of the input beam to the reference leg for providing reference beams;

separating from the second portion of the input beam at least a first beam at a first wavelength and a second beam at a second wavelength;

directing said first beam to a first frequency shifter for providing a first frequency shift to the first beam;

directing said second beam to a second frequency shifter for providing a second frequency shift to the second beam;

combining the frequency shifted first beam and second beam into a reference beam having two frequency shifted wavelengths;

directing said reference beam to means for combining the reference and phase beams;

separating the first portion of the input beam into at least amplifier beams and directing said amplifier beams through at least two optical amplifiers;

amplifying each of said amplifier beams within the optical amplifiers disposed within the phase leg of the interferometer;

coupling a first portion of the output beams from the interferometer as target beams and directing a second portion of the output beams through the phase leg of the interferometer as phase beams to the means for combining the reference beam and the phase beams;

optically heterodyning the reference beam and the phase beams to provide signal beams to at least two optical detectors wherein each detector is in register with the output beams from the optical amplifiers for providing electrical output signals and wherein one detector is a standard detector;

directing a first portion of the electrical output signal from one detector and a first portion of the electrical output signal from the standard detector to a fine mixing circuit wherein the first portion of the electrical output signal from one detector is passed through a band-pass filter, frequency shifted, and heterodyned in a mixer with the first portion of the electrical output signal from the standard detector which has been passed through a band-pass filter to the mixer to provide a fine error signal;

homodyning a second portion of the electrical output signal from one detector to provide a first beat signal;

homodyning a second portion of the electrical output signal from the reference detector to provide a standard beat signal;

heterodyning the beat signal from one detector with the standard beat signal from the standard detector to provide a coarse error signal having a synthetic wavelength; and directing the fine and/or coarse error signals to actuator means attached to means for directing the amplifier beams through the optical amplifier for minimizing the optical path difference of the radiation passing through each of the optical amplifiers.

11. The invention in accordance with claim 9 further including comparing the coarse error signal with a comparator for providing an electrical signal to switch means for providing either a fine error signal or a coarse error signal to the actuator means.

12. The invention in accordance with claim 10 further including directing the fine error signal and the coarse error signal to an integrator, sample-hold circuit for controlling the optical path difference of the amplifier beams passing through each of the optical amplifiers.

* * * * *